(12) United States Patent
Griffin et al.

(10) Patent No.: US 12,260,298 B2
(45) Date of Patent: Mar. 25, 2025

(54) REAL TIME QUBIT ALLOCATION FOR ERROR CORRECTION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 128 days.

(21) Appl. No.: 17/949,627

(22) Filed: Sep. 21, 2022

(65) Prior Publication Data

US 2024/0095573 A1 Mar. 21, 2024

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ................................ G06N 10/70; G06N 10/20
See application file for complete search history.

(56) References Cited

U.S. PATENT DOCUMENTS

| | | | |
|---|---|---|---|
| 8,510,618 B1 | 8/2013 | Pesetski et al. | |
| 10,922,166 B2 | 2/2021 | Hogaboam et al. | |
| 10,997,044 B2 | 5/2021 | Kelly | |
| 2017/0289995 A1* | 10/2017 | Lin | H04W 72/23 |
| 2018/0013521 A1* | 1/2018 | Lee | H04L 1/1851 |
| 2019/0042973 A1 | 2/2019 | Zou et al. | |
| 2021/0006362 A1* | 1/2021 | Loehr | H04L 1/1819 |
| 2021/0240893 A1 | 8/2021 | Gunnels et al. | |
| 2021/0334691 A1 | 10/2021 | Babbush et al. | |
| 2022/0092461 A1 | 3/2022 | Bloom et al. | |

OTHER PUBLICATIONS

Das, Poulami et al., "Lilliput: A Lightweight Low-Latency Lookup-Table Based Decoder for Near-term Quantum Error Correction," arXiv:2108.06569v1 [quant-ph], Aug. 14, 2021, 13 pages.

* cited by examiner

*Primary Examiner* — Mark D Featherstone
*Assistant Examiner* — Rong Tang
(74) *Attorney, Agent, or Firm* — Dority & Manning, P.A.

(57) ABSTRACT

A first set of qubits is allocated to an error correcting process, the error correcting process is configured to utilize the first set of qubits to correct errors identified in a second set of qubits being used by a quantum process. Error correcting information is received from the error correcting process. A quantity of qubits in the first set of qubits is altered based on the error correcting information. Information that identifies an alteration of the quantity of qubits in the first set of qubits is communicated to the error correcting process.

17 Claims, 7 Drawing Sheets

REAL TIME QUBIT ALLOCATION FOR ERROR CORRECTION

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to efficiently and accurately allocate qubits in real time will be desirable.

SUMMARY

The examples disclosed herein implement an adjustable error correction service that performs real time qubit allocation for error correction. In particular, the adjustable error correction service can automatically adjust the quantity of qubits used for error correction based on information from components of the computing system. The adjustable error correction service can use the information to determine the actual number of qubits needed for error correction and increase or decrease the quantity of qubits used for error correction.

In one example, a method for real time qubit allocation for error correction is disclosed. The method includes allocating, by a quantum computing system, a first set of qubits to an error correcting process, the error correcting process configured to utilize the first set of qubits to correct errors identified in a second set of qubits being used by a quantum process. The method further includes receiving, by the quantum computing system from the error correcting process, error correcting information. The method further includes altering, by the quantum computing system, a quantity of qubits in the first set of qubits based on the error correcting information. The method further includes communicating, by the quantum computing system to the error correcting process, information that identifies an alteration of the quantity of qubits in the first set of qubits.

In another example, a quantum computing device for real time qubit allocation for error correction is provided. The quantum computing device includes a memory and a processor device coupled to the memory. The processor device is to allocate a first set of qubits to an error correcting process, the error correcting process configured to utilize the first set of qubits to correct errors identified in a second set of qubits being used by a quantum process. The processor device is to receive from the error correcting process, error correcting information. The processor device is to alter a quantity of qubits in the first set of qubits based on the error correcting information. The processor device is to communicate to the error correcting process, information that identifies an alteration of the quantity of qubits in the first set of qubits.

In another example, a non-transitory computer-readable storage medium is disclosed. The non-transitory computer-readable storage medium includes computer-executable instructions that, when executed, cause one or more processor devices to allocate a first set of qubits to an error correcting process, the error correcting process configured to utilize the first set of qubits to correct errors identified in a second set of qubits being used by a quantum process. The instructions further cause the processor device to receive from the error correcting process, error correcting information. The instructions further cause the processor device to alter a quantity of qubits in the first set of qubits based on the error correcting information. The instructions further cause the processor device to communicate to the error correcting process, information that identifies an alteration of the quantity of qubits in the first set of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
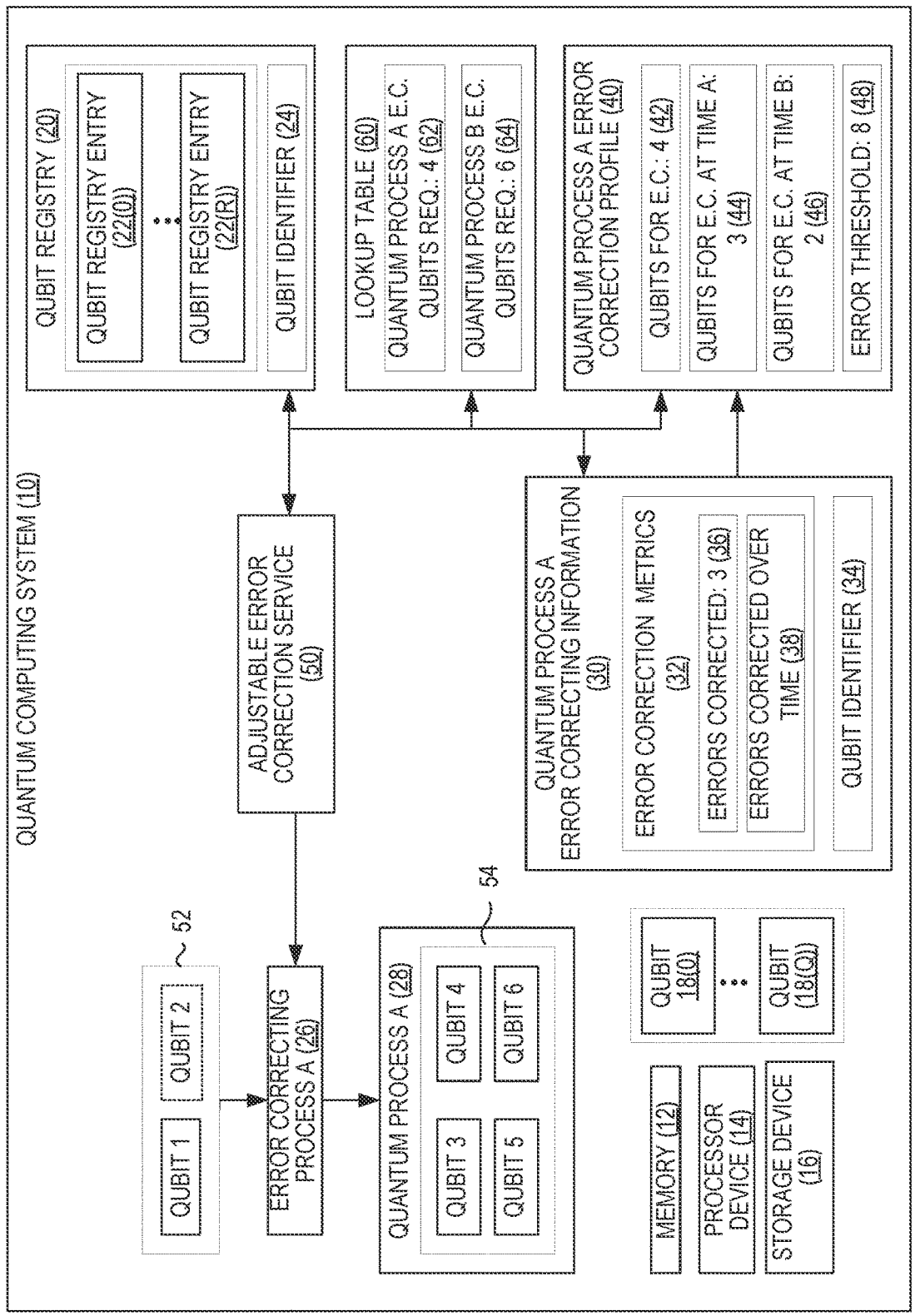
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Quantum computers have a constant need for error correction due to decoherence, which can create an unusable quantum system. Qubits can be isolated to reduce the possibility of decoherence occurring between them. However, as the quantity of qubits in a quantum computing system increase, isolating qubits to reduce the possibility of decoherence becomes more difficult. As a result, error correction may be introduced to decrease the risk of errors due to decoherence. Qubits may be allocated to error correction software for use by quantum processes. However, the number of qubits allocated for error correction needs to be adjusted accordingly when changes in the quantum system causing decoherence occur.

The examples disclosed herein implement an adjustable error correction service that performs real time qubit allocation for error correction. The real time qubit allocation for error correction can occur dynamically, making continuous and automatic adjustments to the number of qubits allocated for error correction to the optimal level. Automatically adjusting the number of qubits allocated for error correction decreases the risk of a quantum computing system becoming unusable due to decoherence because the adjustments are automatic, made quickly and dynamically before decoherence becomes a problem. Qubits can be allocated or deallocated for error correction automatically in response to components in the quantum computing system, such as error correcting information, error correction profiles, error correction metrics, faulty qubit profiles, a qubit registry, and a lookup table. The adjustable error correction service ensures that the quantum computing system is at an optimal level of error correction without wasting computing resources.

A quantum process in the quantum computing system may have a number of qubits allocated to error correction software for error correction. Those qubits can be used to correct errors that are identified in the qubits that are being used by the quantum process. However, a different quantity of qubits may actually be needed for error correction. For example, after running a quantum process for a period of time, error correction information may indicate that the number of qubits allocated to error correction software for error correction may not be enough for error correction. The adjustable error correction service can automatically make an adjustment and add qubits to the error correction software for error correction. In another example, the number of users using a quantum process may increase and, as a result, more qubits may be needed for error correction for the quantum process. The adjustable error correction service can adjust the number of qubits allocated for error correction, adding qubits to the error correction software for error correction.

The adjustable error correction service may monitor components of a quantum computing system to determine the number of qubits that should be allocated for error correction. In one example, the adjustable error correction service can access a lookup table to determine how many qubits are required for error correction. Based on the information in the lookup table, if the error correction software does not have enough qubits allocated for error correction, the adjustable error correction service can automatically allocate additional qubits for error correction. The adjustable error correction service can also monitor a qubit registry within the quantum computing system to determine whether a qubit is available to be allocated for error correction. The adjustable error correction service can then communicate to the error correction software that a qubit is available to use for error correction and obtain the available qubit for error correction. The adjustable error correction service can also monitor the task manager, the core, the scheduler, the heat profiles of the qubits, and other services in the quantum computing system to determine the number of qubits to allocate for error correction.

The adjustable error correction service may use a set of rules that govern the risk of continuing with the current allocation of qubits for error correction. For instance, a rule may indicate that the risk of continuing with the number of qubits currently allocated for error correction for a quantum process is a percentage. As a result, when a number of qubits is allocated for error correction and the risk of continuing with that quantity is above the percentage, the adjustable error correction service can alter the number of qubits allocated for error correction for the quantum process.

Qubits may also be removed from the quantum computing system. In one example, the adjustable error correction service can access a lookup table to determine how many qubits are required for error correction. When the error correction software has an excess of qubits allocated for error correction, the adjustable error correction service can automatically deallocate qubits for error correction. In another example, the adjustable error correction service can access a faulty qubit profile, determine that a qubit matches the faulty qubit profile, and deallocate it for error correction.

FIG. 1 is a block diagram of a quantum computing system 10 that comprises a system memory 12, a processor device 14, and a storage device 16. In the example of FIG. 1, the quantum computing system 10 implements a set of one or more qubits 18(0)-18(Q) for use by quantum processes executed by the quantum computing system 10. To maintain information for the qubit(s) 18(0)-18(Q), the quantum computing system 10 includes a qubit registry 20, which comprises a plurality of qubit registry entries 22(0)-22(R) each corresponding to a qubit such as the one or more qubits 18(0)-18(Q). The qubit registry 20 maintains and provides access to data relating to the qubits implemented by the quantum computing system 10, such as a count of the total number of qubits implemented by the quantum computing system 10 and a count of the number of available qubits that are currently available for allocation, as non-limiting examples. Each of the qubit registry entries 22(0)-22(R) of the qubit registry 20 also stores qubit metadata (not shown) for a corresponding qubit. The qubit metadata may include, as non-limiting examples, a qubit identifier 24 of the corresponding qubit, an availability indicator that indicates whether the corresponding qubit is available for use or is in use by a specific quantum process, an identifier of a quantum service that is associated with the corresponding qubit or to which the corresponding qubit is allocated, and/or an quantum phenomena indicator that indicates whether the corresponding qubit is in an entangled state and/or a superposition state.

The quantum computing system 10 of FIG. 1 executes one or more quantum processes, such as an error correcting process 26 and a quantum process 28. The error correcting process 26 and the quantum process 28 are processes that employ qubits, such as the one or more qubits 18(0)-18(Q), to provide desired functionality. The quantum process 28 may have corresponding error correcting information 30 that contains real time error correction metrics 32 and a qubit identifier 34. The error correction metrics 32 may contain a number of errors corrected 36 for the quantum process 28 and a number of errors corrected over a predetermined period of time 38 for the quantum process 28. The quantum process 28 may have a corresponding error correction profile

40. The error correction profile 40 may be generated for the quantum process 28 that records information about historical error correction for the quantum process 28, such as a quantity of qubits used in error correction 42, a number of qubits allocated for error correction at a first time of day 44, a number of qubits allocated for error correction at a second time of day 46, and an error threshold 48 that indicates an acceptable number of errors. Each quantum process 28 in the quantum computing system 10 can have a corresponding error correction profile 40 and error correcting information 30.

The quantum computing system 10 of FIG. 1 implements an adjustable error correction service 50 that performs real time qubit allocation for error correction. The adjustable error correction service 50 can automatically adjust the qubits used for error correction in a quantum computing system 10.

Specifically, the adjustable error correction service 50 can allocate a first set of qubits 52 to the error correcting process 26 for error correction for the quantum process 28. The quantum process 28 may use qubits allocated in a second set of qubits 54. The qubits allocated in the second set of qubits 54 may contain errors. The adjustable error correction service 50 can configure the error correcting process 26 to use the first set of qubits 52 to correct errors identified in the second set of qubits 54.

In some examples, the adjustable error correction service 50 can allocate the first set of qubits 52 to the error correcting process 26 for the quantum process 28 by accessing the error correction profile 40 for the quantum process 28. The error correction profile 40 can identify the quantity of qubits to use for error correction 42 for the quantum process 28. Based on the information in the error correction profile 40 that identifies the quantity of qubits to use for error correction 42, the adjustable error correction service can allocate the first set of qubits 52 to have that quantity of qubits. For example, the error correction profile 40 for the quantum process 28 may indicate that four qubits are needed for error correction for the quantum process 28. In response, the adjustable error correction service 50 can add or remove qubits from the first set of qubits 52 to allocate a total of four qubits to the first set of qubits 52 for the error correcting process 26.

In some instances, the error correction profile 40 can identify a first number of qubits to be allocated for error correction at a first time of day 44 and a second number of qubits to be allocated for error correction at a second time of day 46. The adjustable error correction service 50 can determine that it is the first time of day or the second time of day and automatically allocate qubits to the first set of qubits 52 to the error correcting process 26 for error correction. Allocating qubits to the first set of qubits 52 can include adding qubits when more qubits are needed for error correction or removing qubits when less qubits are needed for error correction at the time of day.

The adjustable error correction service 50 can receive error correcting information 30 for the quantum process 28 from the error correcting process 26. In some instances, the error correcting information 30 may be received over a period of time. The error correcting information 30 for a quantum process 28 may contain real time error correction metrics 32 for the quantum process 28 and a qubit identifier 34. The error correction metrics 32 can contain metrics such as the number of errors corrected 36 and the number of errors corrected over a predetermined period of time 38 for the quantum process 28. The qubit identifier 34 can identify qubits that have been error corrected.

The adjustable error correction service 50 can alter a first quantity of qubits in the first set of qubits 52 based on the error correcting information 30. The adjustable error correction service 50 can determine that the error correcting information 30 indicates that the quantity of qubits in the first set of qubits 52 should be increased or decreased. Error correcting information 30 that indicates that a qubit is to be added or removed from the first set of qubits 52 can be communicated to the error correcting process 26 and the adjustable error correction service 50 may add qubits to the first set of qubits 52 or remove qubits from the first set of qubits 52. In response to adding or removing qubits from the first set of qubits 52, the adjustable error correction service 50 can communicate to the error correcting process 26, information that identifies an alteration of the first quantity of qubits in the first set of qubits 52 and the qubit that was error corrected. For example, the quantum process 28 may be using four qubits in the second set of qubits 54. The adjustable error correction service 50 may receive from the error correcting information 30 for the quantum process 28, information that indicates that only three qubits are needed for error correction. In response, the adjustable error correction service 50 can remove one qubit from the first set of qubits 52 allocated to error correction. Information that identifies the removed qubit as an available qubit may be sent to the qubit registry 20.

In some instances, altering the first quantity of qubits in the first set of qubits 52 may be based on data from the qubit registry 20. For example, when the quantity of qubits in the first set of qubits 52 is to be increased, an available qubit can be found to add to the first set of qubits 52. The qubit registry 20 can maintain information about the number of available qubits that are currently available for allocation. The qubit identifier 24 in the qubit registry 20 can identify an available qubit. The adjustable error correction service 50 can request the available qubit from the qubit registry 20 and receive the qubit identifier 24 that identifies an available qubit from the qubit registry 20. Information that identifies the available qubit (i.e., the qubit identifier 24) can be communicated to the error correcting process 26 and the first quantity of qubits in the first set of qubits 52 can then be altered by adding the available qubit to it.

In some instances, altering the first quantity of qubits in the first set of qubits 52 may be based on information in a lookup table 60. The lookup table 60 may have a ratio of qubits to error correction sensitivity encoded. The lookup table 60 can include an entry for each quantum process 28 in the quantum computing system 10 that indicates the number of qubits that are required for error correction. The entry for each quantum process 28 correlates to a corresponding number of qubits for error correction. For instance, the lookup table 60 may contain an entry for a quantum process 62 that indicates that the process requires four qubits for error correction and an entry for another quantum process 64 that indicates that the process requires six qubits for error correction. The adjustable error correction service 50 can access the lookup table 60 and the entry that corresponds to the quantum process 28. The first quantity of qubits in the first set of qubits 52 for the quantum process can then be altered by adding or removing qubits based on the number of qubits required for error correction as indicated in the lookup table 60 entry.

In some examples, error correction metrics 32 can be compared to a predetermined threshold, such as the error threshold 48 in the error correction profile 40, to determine that qubits are to be allocated or deallocated for error correction. For instance, the error threshold 48 can indicate an acceptable number of errors for the quantum process 28 or an acceptable percentage. In response, the adjustable error correction service 50 can alter the first quantity of qubits in the first set of qubits 52 based on the comparison of the error correction metrics 32 and the error threshold 48.

It is to be understood that, because the adjustable error correction service 50 is a component of the quantum computing system 10, functionality implemented by the adjustable error correction service 50 may be attributed to the quantum computing system 10 generally. Moreover, in examples where the adjustable error correction service 50 comprises software instructions that program the processor device 14 to carry out functionality discussed herein, functionality implemented by the adjustable error correction service 50 may be attributed herein to the processor device 14. It is to be further understood that while, for purposes of illustration only, the adjustable error correction service 50 is depicted as a single component, the functionality implemented by the adjustable error correction service 50 may be implemented in any number of components, and the examples discussed herein are not limited to any particular number of components.

Figure 2:
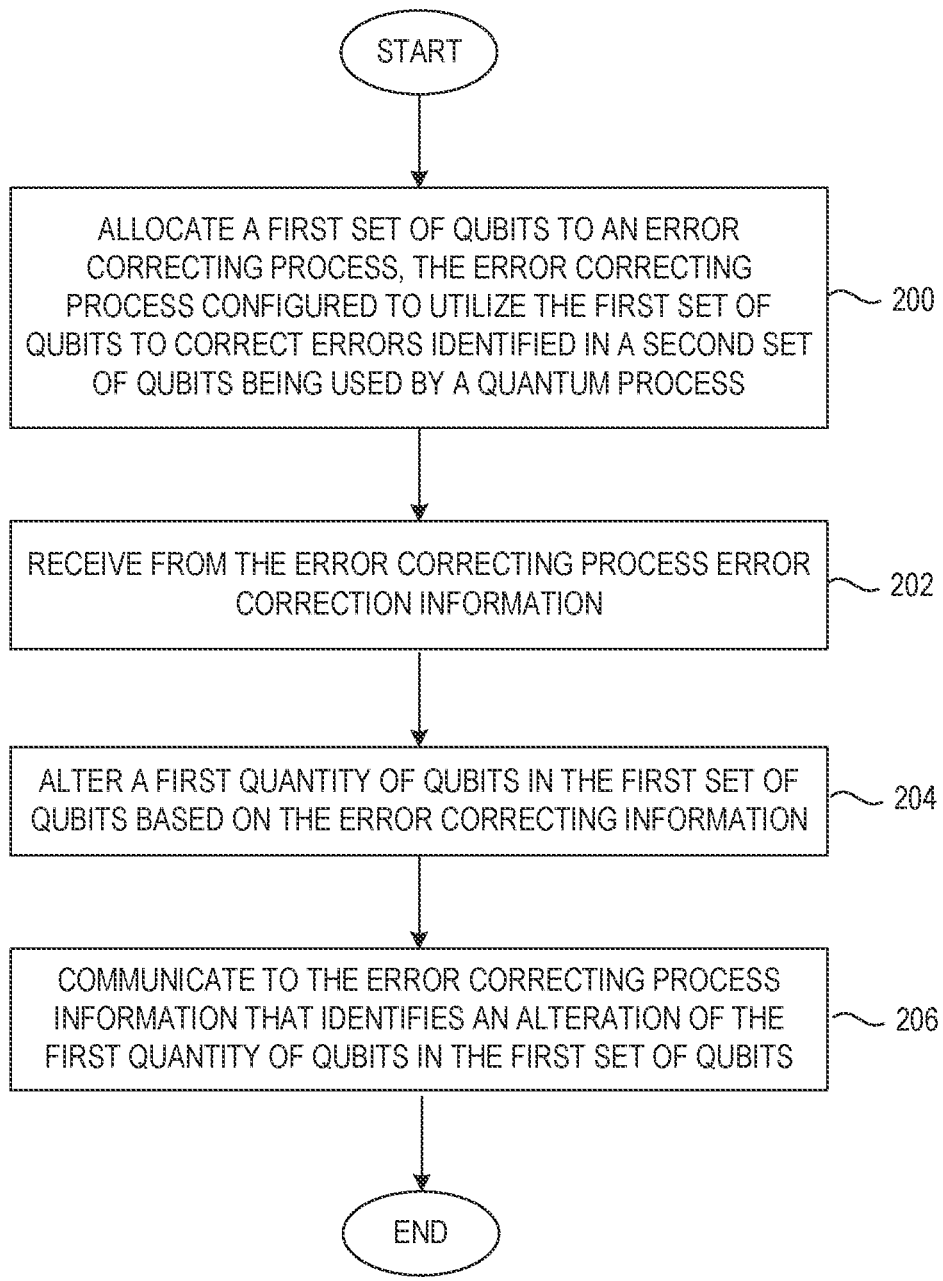
FIG. 2 is a flowchart illustrating operations performed by the quantum computing system of FIG. 1 for real time qubit allocation for error correction, according to one example.

To illustrate exemplary operations performed by the quantum computing system 10 of FIG. 1 for managing real time qubit allocation for error correction according to one example, FIG. 2 provides a flowchart. Elements of FIG. 1 are referenced in describing FIG. 2 for the sake of clarity.

In FIG. 2, operations begin with a processor device of a computing device, such as the processor device 14 of the quantum computing system 10 of FIG. 1, allocating a first set of qubits 52 to an error correcting process 26, the error correcting process 26 configured to use the first set of qubits 52 to correct errors identified in a second set of qubits 54 that are being used by a quantum process 28 (block 200).

The processor device 14 then receives from the error correcting process 26 error correcting information 30 (block 202). The processor device 14 then alters a first quantity of qubits in the first set of qubits 52 based on the error correcting information 30 (block 204). The processor device 14 then communicates to the error correcting process 26 information that identifies an alteration of the first quantity of qubits in the first set of qubits 52 (block 206).

Figure 3:
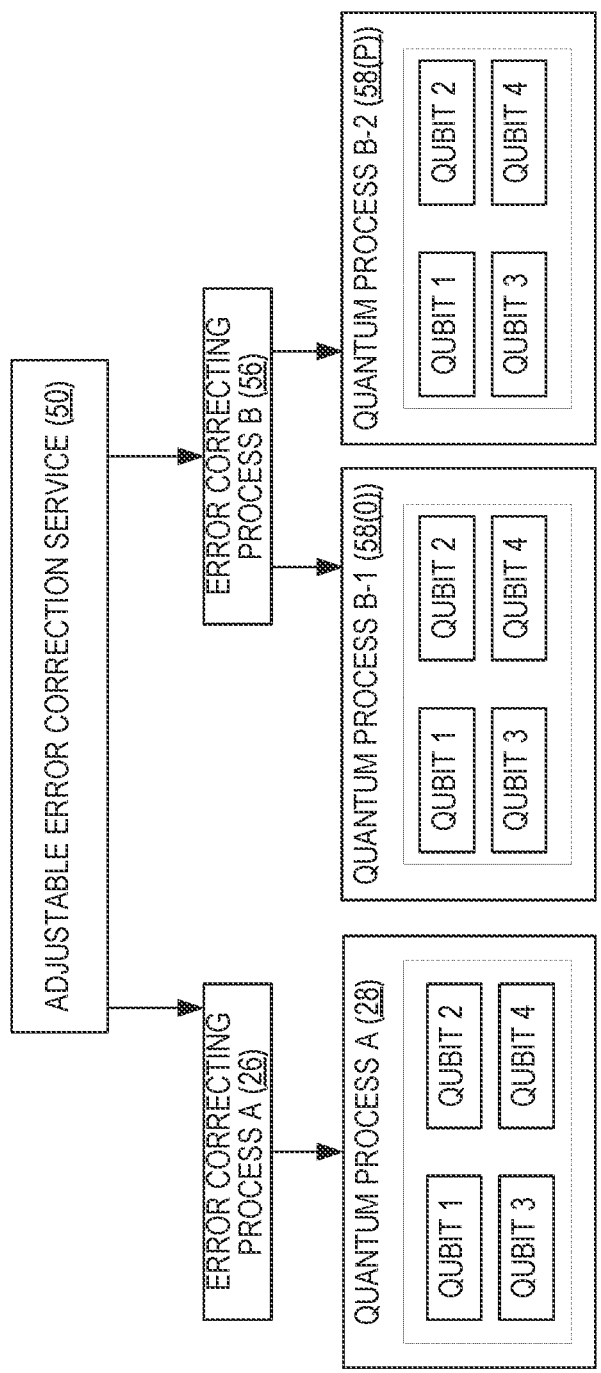
FIG. 3 is a simpler block diagram of the quantum computing system of FIG. 1 for real time qubit allocation for error correction, according to one example.

FIG. 3 is a simpler block diagram of the quantum computing system of FIG. 1 for real time qubit allocation for error correction, according to one example. For the sake of clarity, elements of FIG. 1 are referenced in describing FIG. 3. In the example of FIG. 3, a quantum computing system 10 comprises a system memory 12, a processor device 14, and a storage device 16. The error correcting process 26 can provide error correction for one quantum process 28. Another error correcting process 56 can provide error correction for multiple quantum processes 58(0)-58(P). Each quantum process 58(0)-58(P) has a corresponding error correcting information 30 and a corresponding error correction profile 40. An error correction profile 40 may be generated for each quantum process 58(0)-58(P) that records information about historical error correction for the quantum process 58(0)-58(P).

Figure 4:
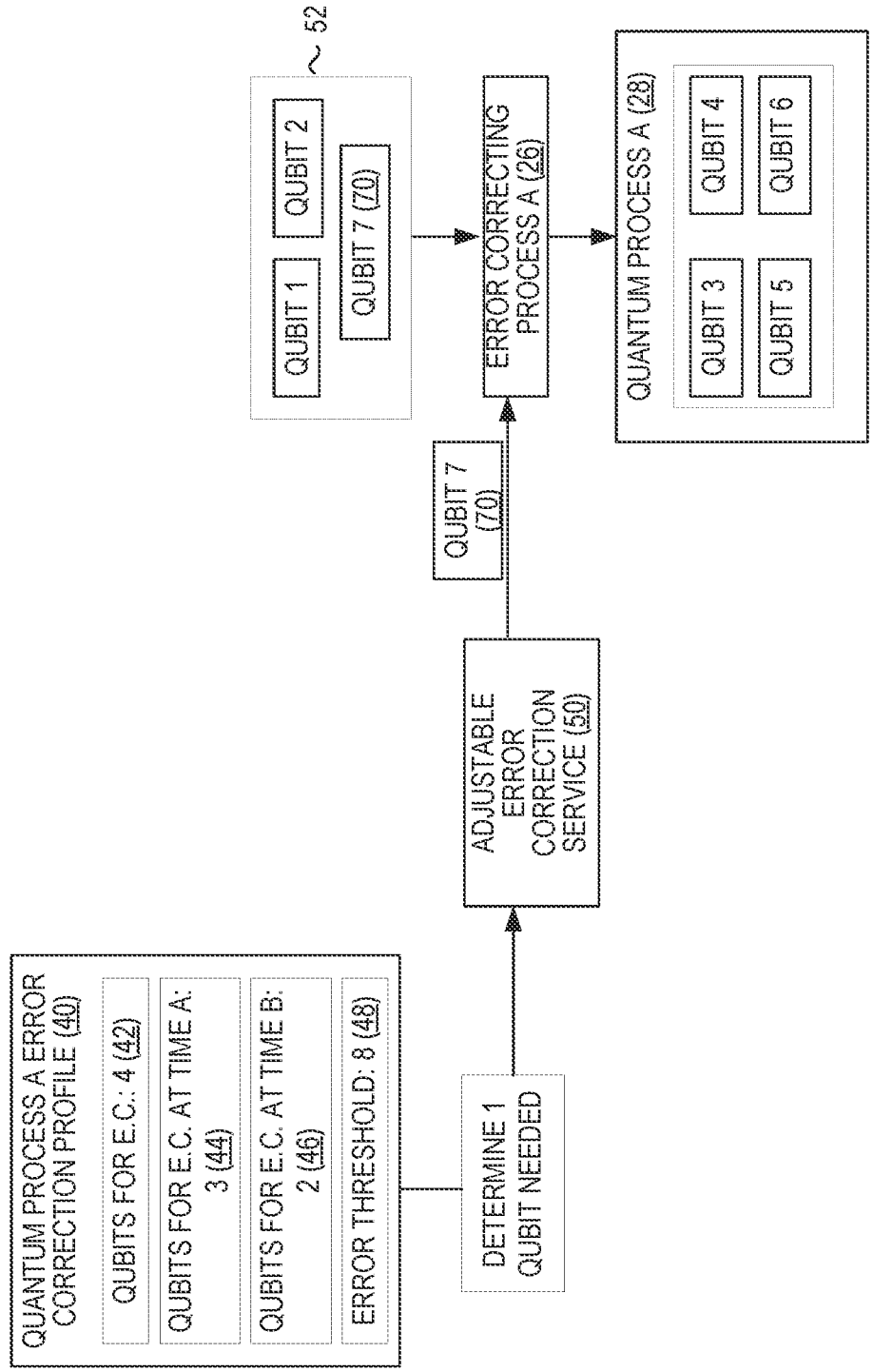
FIG. 4 is a simpler block diagram of the quantum computing system of FIG. 1 for real time qubit allocation for error correction, according to one example.

FIG. 4 provides a simpler block diagram of the quantum computing system 10 of FIG. 1 for real time qubit allocation for error correction, according to one example. For the sake of clarity, elements of FIG. 1 are referenced in describing FIG. 4. In the example of FIG. 4, a quantum computing system 10 comprises a system memory 12, a processor device 14, and a storage device 16. An adjustable error correction service 50 can access an error correction profile that corresponds to a quantum process 28 in order to allocate a first set of qubits 52 to an error correcting process 26. The error correction profile 40 can include information that identifies a quantity of qubits for the quantum process 28 to use for error correction 42, a number of qubits allocated for error correction at a first time of day 44, a number of qubits allocated for error correction at a second time of day 46, and an error threshold 48 that indicates an acceptable number of errors. In one example, the adjustable error correction service 50 may access the error correction profile 40 for the quantum process 28 to determine the quantity of qubits to use for error correction 42. The adjustable error correction service 50 may determine that the first set of qubits 52 does not have the quantity of qubits needed for error correction. The adjustable error correction service may then allocate an additional qubit 70 to the first set of qubits 52 for use in error correction for the quantum process 28. The qubit 70 allocated to the first set of qubits 52 may be a qubit that is available for allocation. A qubit identifier 24 in the qubit registry 20 can identify an available qubit. The adjustable error correction service 50 can request an available qubit from a qubit registry 20 and receive the qubit identifier 24 that identifies the available qubit 70, which can be communicated to the error correcting process 26. The first quantity of qubits in the first set of qubits 52 can then be altered by adding the available qubit 70 to it for use in error correction for the quantum process 28.

In another example, the adjustable error correction service 50 may determine that the first set of qubits 52 has an extra qubit allocated to the error correcting process 26 and remove a qubit from the first set of qubits 52.

Figure 5:
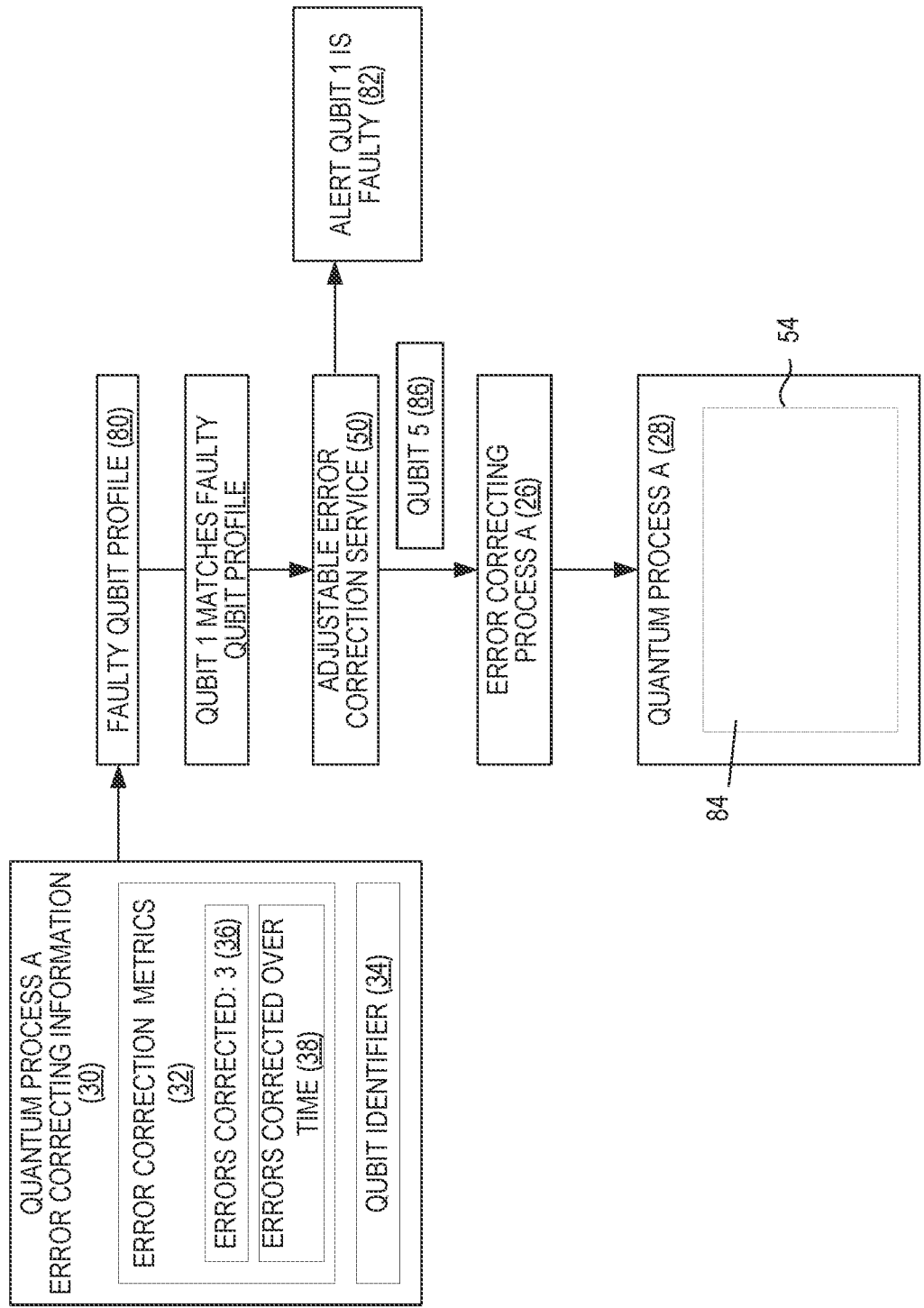
FIG. 5 is a simpler block diagram of the quantum computing system of FIG. 1 for real time qubit allocation for error correction, according to one example.

FIG. 5 provides a simpler block diagram of the quantum computing system 10 of FIG. 1 for real time qubit allocation for error correction, according to one example. For the sake of clarity, elements of FIG. 1 are referenced in describing FIG. 5. In the example of FIG. 5, an adjustable error correction service 50 may use the error correcting information 30 to determine that a qubit in a second set of qubits 54 matches a faulty qubit profile 80. For example, a faulty qubit profile 80 may indicate when a qubit is not fit for use due to physical issues, such as a high error rate of degradation of quality. A qubit that matches a faulty qubit profile 80 may not be used for error correction by an error correcting process 26 for a quantum process 28. In response to determining that a qubit in the second set of qubits 54 matches the faulty qubit profile 80, an alert that the qubit is faulty 82 can be sent. The adjustable error correction service 50 can then deallocate a faulty qubit 84 from the second set of qubits 54 and allocate a qubit 86 to the second set of qubits 54. The qubit 86 allocated to the second set of qubits 54 may be a qubit that is available for allocation. A qubit identifier 24 in a qubit registry 20 can identify an available qubit. The adjustable error correction service 50 can request an available qubit from the qubit registry 20 and receive the qubit identifier 24 that identifies an available qubit 86, which can be communicated to the error correcting process 26. The quantity of qubits in the second set of qubits 54 can then be altered by adding the available qubit 86 to it.

Figure 6:
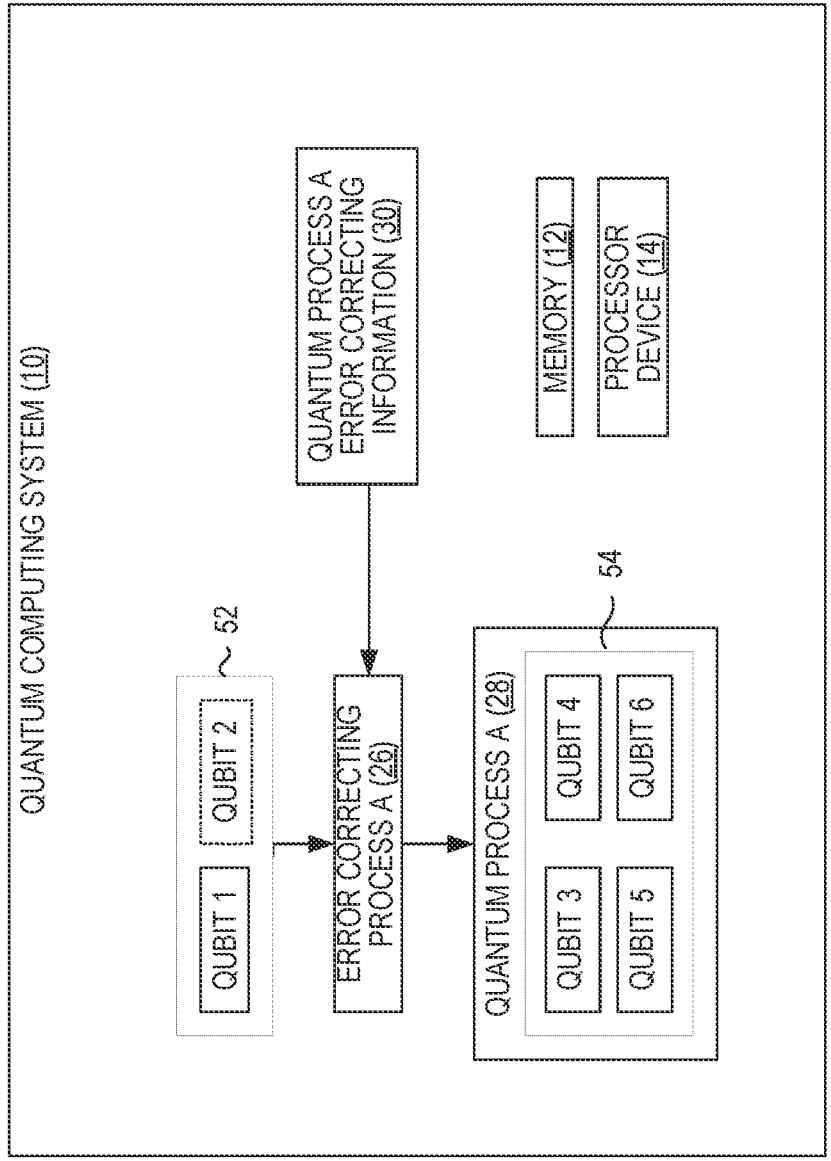
FIG. 6 is a simplified block diagram of the environment illustrated in FIG. 1 according to one implementation.

FIG. 6 is a simplified block diagram of the environment illustrated in FIG. 1 according to one implementation. FIG. 6 includes the quantum computing device 10, which in turn includes the memory 12 and the processor device 14 coupled to the memory 12. The processor device 14 is to allocate the first set of qubits 52 to the error correcting process 26, the error correcting process 26 configured to utilize the first set of qubits 52 to correct errors identified in the second set of qubits 54 being used by a quantum process 28. The processor device 14 is further to receive from the error correcting process 26, error correcting information 30. The processor device 14 is further to alter the first quantity of qubits in the first set of qubits 52 based on the error correcting information 30. The processor device 14 is further to communicate to the error correcting process 26, information that identifies an alteration of the first quantity of qubits in the first set of qubits 52.

Figure 7:
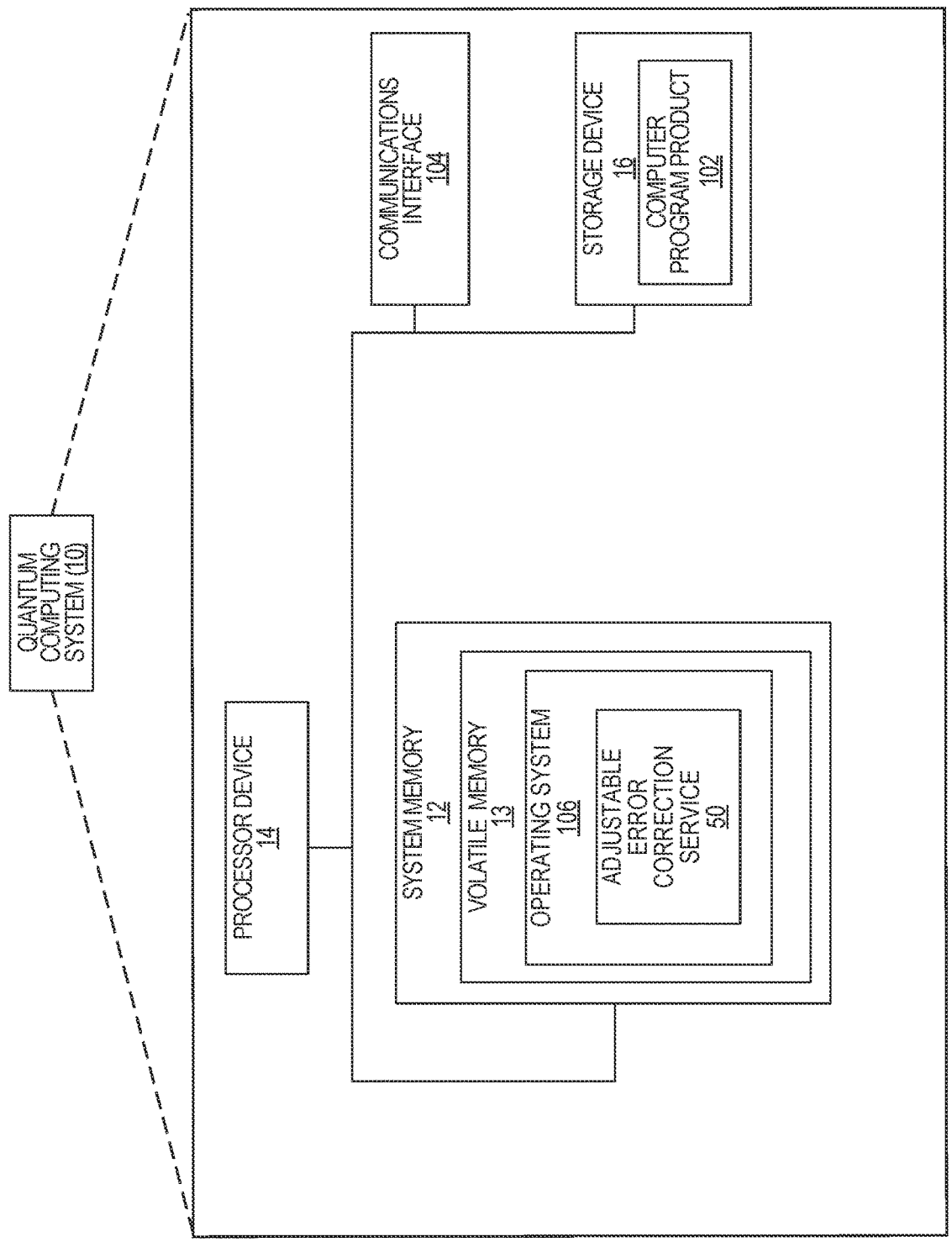
FIG. 7 is a block diagram of a quantum computing device suitable for implementing examples, according to one example.

FIG. 7 is a block diagram of a quantum computing system, such as the quantum computing system 10 of FIG. 1, suitable for implementing examples according to one example. The quantum computing system may comprise any suitable quantum computing device or devices. The quantum computing system can operate using classical computing principles or quantum computing principles. Thus, in some implementations, portions of the quantum computing system 10 (e.g., the adjustable error correction service 50 described further herein) may be executed using classical computing components and/or algorithms. When using quantum computing principles, the quantum computing system 10 performs computations that utilize quantum-mechanical phenomena, such as superposition and/or entanglement states. The quantum computing system 10 may operate under certain environmental conditions, such as at or near zero degrees (0°) Kelvin. When using classical computing principles, the quantum computing system 10 utilizes binary digits that have a value of either zero (0) or one (1).

The quantum computing system 10 includes a system memory 12, a processor device 14, and a storage device 16. The processor device 14 can be any commercially available or proprietary processor. The system memory 12 may include volatile memory 13 (e.g., random-access memory (RAM)).

The quantum computing system 10 may further include or be coupled to a non-transitory computer-readable storage medium such as a storage device 16. The storage device 16 may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 16 and other drives associated with computer-readable media and computer-usable media may provide non-volatile storage of data, data structures, computer-executable instructions, and the like. The storage device may also provide functionality for storing one or more qubits.

A number of modules can be stored in the storage device 16 and in the volatile memory 13, including an operating system 106 and one or more modules, such as the adjustable error correction service 50. All or a portion of the examples may be implemented as a computer program product 102 stored on a transitory or non-transitory computer-usable or computer-readable storage medium, such as the storage device 16, which includes complex programming instructions, such as complex computer-readable program code, to cause the processor device 14 to carry out the steps described herein. Thus, the computer-readable program code can comprise computer-executable instructions for implementing the functionality of the examples described herein when executed on the processor device 14.

An operator may also be able to enter one or more configuration commands through a keyboard (not illustrated), a pointing device such as a mouse (not illustrated), or a touch-sensitive surface such as a display device (not illustrated). The quantum computing system 10 may also include a communications interface 104 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   allocating, by a quantum computing system, a first set of qubits to an error correcting process, the error correcting process configured to utilize the first set of qubits to correct errors identified in a second set of qubits being used by a quantum process;
   receiving, by the quantum computing system from the error correcting process, error correcting information;
   accessing, by the quantum computing system, a lookup table that correlates, for each quantum process of a plurality of quantum processes, a corresponding minimum number of qubits required for error correction;
   altering, by the quantum computing system, a first quantity of qubits in the first set of qubits based on the error correcting information to obtain a reduced quantity of qubits greater than or equal to the minimum number of qubits required for error correction for the quantum process; and
   communicating, by the quantum computing system to the error correcting process, information that identifies an alteration of the first quantity of qubits in the first set of qubits.

2. The method of claim 1, wherein allocating, by the quantum computing system, the first set of qubits to the error correcting process further comprises:
   accessing an error correction profile that corresponds to the quantum process, the error correction profile identifying a quantity of qubits for use in error correction for the quantum process; and
   allocating the first set of qubits to have the first quantity of qubits, wherein the first quantity of qubits comprises the quantity of qubits for use in error correction for the quantum process.

3. The method of claim 1, wherein the error correcting process provides error correction for the plurality of quantum processes.

4. The method of claim 1, wherein the error correcting information comprises real time error correction metrics.

5. The method of claim 4, wherein the real time error correction metrics comprise a number of errors corrected.

6. The method of claim 4, wherein the real time error correction metrics comprise a number of errors corrected over a predetermined period of time.

7. The method of claim 1, wherein the error correcting information comprises a qubit identifier that identifies a qubit that has been error corrected.

8. The method of claim 1, wherein altering, by the quantum computing system, the first quantity of qubits in the first set of qubits based on the error correcting information to obtain the reduced quantity of qubits comprises:
   comparing real time error correction metrics to a predetermined threshold; and
   in response, deallocating qubits for error correction.

9. The method of claim 1, further comprising:
   determining, based on the error correcting information, that a first qubit in the second set of qubits matches a faulty qubit profile; and
   in response, sending an alert that the first qubit matches the faulty qubit profile.

10. The method of claim 9 further comprising:
deallocating the first qubit from the second set of qubits; and
allocating a second qubit to the second set of qubits.

11. The method of claim 1, further comprising:
receiving the error correcting information over a period of time; and
generating an error correction profile that corresponds to the quantum process.

12. The method of claim 11, further comprising generating an error correction profile for each quantum process of the plurality of quantum processes, wherein the plurality of quantum processes are executed in the quantum computing system.

13. The method of claim 11, wherein the error correction profile identifies an acceptable error threshold for the quantum process.

14. The method of claim 1,
wherein communicating the information that identifies the alteration of the first quantity of qubits in the first set of qubits comprises:
communicating, to the error correcting process, information that indicates a first qubit is to be removed from the first set of qubits.

15. The method of claim 14, further comprising sending, to a qubit registry, information that identifies the first qubit as an available qubit.

16. A quantum computing device, comprising:
a memory; and
a processor device coupled to the memory, the processor device to:
allocate a first set of qubits to an error correcting process, the error correcting process configured to utilize the first set of qubits to correct errors identified in a second set of qubits being used by a quantum process;
receive, from the error correcting process, error correcting information;
access a lookup table that correlates, for each quantum process of a plurality of quantum processes, a corresponding minimum number of qubits required for error correction;
alter a first quantity of qubits in the first set of qubits based on the error correcting information to obtain a reduced quantity of qubits greater than or equal to the minimum number of qubits required for error correction for the quantum process; and
communicate, to the error correcting process, information that identifies an alteration of the first quantity of qubits in the first set of qubits.

17. A non-transitory computer-readable storage medium that includes computer-executable instructions that, when executed, cause one or more processor devices to:
allocate a first set of qubits to an error correcting process, the error correcting process configured to utilize the first set of qubits to correct errors identified in a second set of qubits being used by a quantum process;
receive from the error correcting process, error correcting information;
access a lookup table that correlates, for each quantum process of a plurality of quantum processes, a corresponding minimum number of qubits required for error correction;
alter a first quantity of qubits in the first set of qubits based on the error correcting information to obtain a reduced quantity of qubits greater than or equal to the minimum number of qubits required for error correction for the quantum process; and
communicate, to the error correcting process, information that identifies an alteration of the first quantity of qubits in the first set of qubits.

* * * * *